United States Patent
Martin et al.

(10) Patent No.: US 9,386,630 B2
(45) Date of Patent: Jul. 5, 2016

(54) DEVICE FOR TAKING CONTROL OF RESOURCES IN A COMMUNICATION NETWORK IN ORDER TO INSERT TRAFFIC

(75) Inventors: Béatrice Martin, Paris (FR); Jacques Couet, Meriel (FR)

(73) Assignee: Alcatel Lucent, Boulogne-Billancourt (FR)

( * ) Notice: Subject to any disclaimer, the term of this patent is extended or adjusted under 35 U.S.C. 154(b) by 2644 days.

(21) Appl. No.: 10/629,597

(22) Filed: Jul. 30, 2003

(65) Prior Publication Data

US 2004/0024791 A1 Feb. 5, 2004

(30) Foreign Application Priority Data

Aug. 1, 2002 (FR) ...................................... 02 09819

(51) Int. Cl.
  *G06F 15/16* (2006.01)
  *H04W 92/12* (2009.01)
  *H04B 7/185* (2006.01)

(52) U.S. Cl.
  CPC ........... *H04W 92/12* (2013.01); *H04B 7/18563* (2013.01)

(58) Field of Classification Search
  USPC ................................. 709/223–224, 230, 248
  See application file for complete search history.

(56) References Cited

U.S. PATENT DOCUMENTS

| | | | |
|---|---|---|---|
| 5,898,683 A * | 4/1999 | Matsumoto et al. | 370/338 |
| 6,181,948 B1 * | 1/2001 | Kondo | 455/517 |
| 6,937,577 B1 * | 8/2005 | Torikka et al. | 370/310.1 |
| 7,054,638 B2 * | 5/2006 | Rune et al. | 455/450 |
| 2003/0224772 A1 * | 12/2003 | Patzer et al. | 455/419 |

OTHER PUBLICATIONS

ETSI: "Universal Mobile Telecommunications System (UMTS); UTRAN Iub Interface: General Aspects and Principles (3GPP TS 25.430 version 5.1..0 Release 5)" ETSI TS 125 430 V5.1.0 Jun. 2002, pp. 1-26, XP002237600.
ETSI: "Universal Mobile Telecommunications System (UMTS); UTRAN Iub/Iur Interface User Plane Protocol forDCH Data Streams (3GPP TS 25.427 version 4.2.0 Release 4)" ETSI TS 125 427 V4.2.0 Sep. 2001, pp. 1-33, XP002237601.
Delli Priscoli F: "UMTS Architecture for Integrating Terrestrial and Satellite Systems" IEEE Multimedia, IEEE Computer Society, US, vol. 6, No. 4 Oct. 1999, pp. 38-45, XP000880603.
Obradovic V: "Evolution Phases Integrating Satellite and Terrestrial Networks in the Configuration of S-UMTS" 1999 IEEE 49th. Vehicular Technology Conference. Houston, TX, May 16-20, 1999, IEEE Vehicular Technology Conference, New York, NY: IEEE, US, vol. 2 conf. 49, May 16, 1999, pp. 1375-1379, XP000903270.

* cited by examiner

*Primary Examiner* — Mohamed Ibrahim
(74) *Attorney, Agent, or Firm* — Chiesa Shahinian & Giantomasi, PC

(57) ABSTRACT

A data management device for a communication installation including at least one base station having resources and at least one terrestrial node connected to a core network and to the base station to control its resources via an interface includes a control device coupled to a traffic source and to the interface and able to take local control, on command, of at least a portion of the resources of the base station, instead of the node, to enable transfer of data between the traffic source and the base station.

19 Claims, 4 Drawing Sheets

DEVICE FOR TAKING CONTROL OF RESOURCES IN A COMMUNICATION NETWORK IN ORDER TO INSERT TRAFFIC

CROSS-REFERENCE TO RELATED APPLICATIONS

This application is based on French Patent Application No. 02 09 819 filed Aug. 1, 2002, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of communication between terminals within a network, more particularly the field of controlling resources of any type (radio, optical, mechanical (in particular acoustic), or electrical (analog) resources) offered by base stations of a network.

In the present context, the term "terminal" refers to any network equipment, and in particular any user equipment, such as fixed or mobile computers, mobile telephones, and servers.

2. Description of the Prior Art

The person skilled in the art knows that a communication network (or installation) generally comprises a core network (CN) coupled to one or more nodes each coupled via an interface to one or more base transceiver stations, each associated with one or more cells each covering an area, for example a radio area, in which one or more user equipments such as mobile telephones may be located. These nodes are known as base station controllers (BSC) in 2G and 2.5G networks such as GSM and GPRS networks or as radio network controllers (RNC) in 3G networks such as UMTS networks. Also, base stations are known as base transceiver stations (BTS) in a GSM or GPRS network and a Node B in a UMTS network.

In UMTS networks, for example, the RNCs control the Nodes B, and in particular manage their radio resources, and control the terrestrial transfer of traffic between the core network and the Nodes B, via a Iub interface. To be more precise, the Iub interface comprises a stack of protocols divided between different network elements (RNCs and Nodes B), as shown in FIG. 1.

With regard to the frame portion to be transmitted at the radio (Uu) interface, the portion of the protocol stack managing the Iub interface implemented in a Node B comprises a frame protocol (FP) module with a number of functions, in particular that of transporting at the Iub interface transport blocks (i.e. blocks of radio frames that are then transmitted or received by the radio modem (or physical layer (PHY) of the Node B), transporting power control (outer loop) information from the RNC to the Node B, supporting transport channel synchronization mechanisms, supporting Node B synchronization mechanisms, and transferring parameters from the radio interface of the RNC to the Node B.

The portion of the protocol stack implemented in a Node B comprises two subsystems for controlling communication with terminals at the Uu interface.

A first subsystem manages the broadcast control channel (BCCH). To this end, a portion of layers 2 and 3 of the radio interface is implemented in the Node B, in particular radio resource control (RRC-b), radio link control (RLC-b), and medium access control (MAC-b) portions. The Node B can therefore, firstly, insert into the system blocks of the BCCH the information relating to certain radio parameters of the cells that it manages (RRC-b function), secondly, segment the system information blocks into transport blocks (RLC-b function), and, thirdly, handle BCCH scheduling (MAC-b function).

A second subsystem manages the Node B. It comprises the Node B Application Part (NBAP) protocol, which has a number of functions, in particular managing the configuration of the cells, which enables the RNC to manage the cell configuration information under the control of the Node B, to manage common transport channels, which enables the RNC to configure said channels, to manage "resource" events, which enables the Node B to inform the RNC of the status of its radio resources, and to align the configuration, which enables the RNC and the Node B to verify that they hold the same radio resource configuration information, and where applicable to coordinate that information.

The above networks are entirely satisfactory in the standard mode of operation, i.e. when data is exchanged between the core network and the user equipments. On the other hand, if it is required to connect to this type of network a traffic source other than those already constituting the user equipments and the core network, for example via a satellite link, even if only momentarily, this must be effected at the level of the Iub interface between the node (RNC) and the base station(s) (Node(s) B) concerned. This causes a number of problems. Similar problems arise if it is required to transfer traffic directly to a base station (Node B) and from a core network without going via the RNC, even if only momentarily, or when it is required to use a satellite link to transmit traffic, for example, rather than the conventional terrestrial link (this is known as "backhauling via satellite").

The above problems include in particular the increase in the transmission time-delay to the base station (Node B), which seriously interferes with the operation of the algorithms for managing resources, for example radio resources (allocation of codes, power control, handover, and the like), and which is reflected in a degraded quality of service. This problem is particularly severe in the case of backhauling via satellite.

There are also the problems of controlling the resources, for example radio resources, of the base station (Node B), of programming the physical layer (PHY) and of "level 2" protection, which functions are situated in the node (RNC) and whose associated protocol is operative at the Iub interface. Inserting a new traffic source, for example via a satellite link, would necessitate the installation in the satellite link of the functions of the Iub interface, which would amount to coupling the base station(s) (Nodes(s) B) to an additional interface. However, for the portion controlled by the RNC, the architecture of the Universal Terrestrial Radio Interface Network (UTRAN) allows management of Nodes B only via a single Iub interface.

There is also the problem of controlling synchronization of the reference clock of the channels under the control of the base stations (Nodes B). This problem is particularly serious if the base stations are used as terrestrial repeaters, for example within a data broadcasting installation, in particular a satellite installation. In this type of installation, the satellite transmits the same traffic on a first frequency $f_{MSS}$ and a second frequency $f_{FSS}$ respectively to user equipment (UE) in the cells managed by the base stations (Nodes B) and to said base stations, which relay said received traffic to the user equipments concerned on the frequency $f_{MSS}$. As a result of this the user equipments can receive the same traffic twice on the same frequency $f_{MSS}$, but offset in time, which generates conflicts.

Thus an object of the invention is to cure some or all of the drawbacks previously cited.

SUMMARY OF THE INVENTION

To this end it proposes a data management device for a communication installation including at least one base station having resources and at least one terrestrial node connected to a core network and to the base station to control its resources via an interface, which device includes control means adapted to be coupled to a traffic source and to the interface and adapted to take local control, on command, of at least a portion of the resources of the base station, instead of the node, to enable transfer of data between the traffic source and the base station.

It is therefore possible to reserve momentarily all or some of the resources of at least one of the base stations to transmit the traffic from the traffic source, prohibiting (or blocking) their use by the node. This intervention occurs at the level of the node/base station interface, and is therefore transparent to the node(s), the base station(s), and the protocols operative at the interface.

The control means preferably include at least a portion of a stack of protocols dedicated to management of the resources so as:

to manage the configuration of at least one portion of at least one cell managed by the base station and the associated resources,
to control at least one portion of the configuration of data transport channels managed by the base station,
to manage "resource" events generated by the base station and representative of the status of its resources, and
to check that identical configuration information is held by the base station and the node.

The control means preferably include at least the portion of the stack of protocols dedicated to managing synchronization of channels under the control of the base station.

In the above embodiments, the portions of the stack of protocols dedicated to resource management and synchronization are preferably chosen from a group comprising at least a portion of the Node B Application Part protocol, at least a portion of the Radio Resource Control protocol, at least a portion of the Frame Protocol, at least a portion of the Radio Link Control protocol, at least a portion of the Medium Access Control protocol, at least a portion of the Packet Data Convergence protocol, and at least a portion of the Broadcast/Multicast Control protocol. In this case, the portions of the protocols previously cited that are installed in the nodes are duplicated in the device.

The control means advantageously include a filter module adapted to filter the traffic from the traffic source and the traffic from the node. The control means preferably further include a message generator module adapted to send the node the messages indicating that resources have been blocked.

The control means advantageously take control of local resources in three phases. A first phase is initiated (preferably by the filter module) on receipt of a request from the traffic source to transmit traffic addressed to one or more user equipments in one or more cells managed by one or more base stations. This instigates the sending to each base station concerned of a resource reservation request. A second phase is initiated by each interrogated base station sending a response message to the control means. On receipt of the message(s) indicating the availability of the resources of the base stations, the control means send the node(s) to which the base station(s) are coupled a message signaling that the available resources are blocked. A third phase is initiated by the transmission of the traffic from the traffic source. At the end of transmission, the control means (preferably the message generation module thereof) send a message to each base station telling it to release its resources that have been used and a message to the node telling it that these resources have been unblocked and are available to it again.

The control means of the device advantageously further include a synchronization adaptation module able to take account of divergences in the transmission time-delays of traffic from the traffic source and the (terrestrial) node.

Furthermore, in an installation including means adapted to transmit data from the traffic source by radio, at first and second frequencies, respectively to user equipments situated in a cell managed by the base station and to the base station, the control means are preferably adapted to calculate a transmission difference representative of the difference between the transmission times of the data at the first and second frequencies and to delay the data received and to be transmitted to the base station by an amount substantially equal to the calculated difference.

The control means of the device can be installed in a module provided with a connection interface for connecting them to the base stations or to a terminal, for example a satellite, coupled to a base station and to a satellite supplied by the traffic source. In this case, the device is of the plug and play type. However, the device according to the invention can instead be installed directly in each base station or in a satellite terminal coupled to a base station and to a satellite supplied by the traffic source.

The invention also provides a communication installation including at least one base station having resources and at least one terrestrial node connected to a first core network and to the base station to control its resources via an interface, which installation includes a device as defined above.

The installation advantageously further includes a satellite access network taking one of the following forms:

it includes at least one satellite gateway connected to the node, at least one satellite terminal connected to one of the base stations, and at least one communication satellite adapted to exchange data by radio with the satellite gateway and with the satellite terminal, the node and the core network together constituting the traffic source;
it includes at least one satellite gateway connected to a traffic source, at least one satellite terminal connected to one of the base stations and to the node, and at least one communication satellite adapted to exchange data by radio with the satellite gateway and with the satellite terminal;
it includes at least one satellite gateway connected to a satellite node connected to a second core network and together therewith constituting the traffic source, at least one satellite terminal connected to one of the base stations and to the node, and at least one communication satellite adapted to exchange data by radio with the satellite gateway, with the satellite terminal, and with user equipments adapted to exchange data with the base station via the resources.

However, the traffic source can instead be a terrestrial source, and the invention relates generally to all situations in which a plurality of portions of one or more installations have relatively divergent transmission time-delays. Thus the traffic source can comprise a transmission line coupled to a router that slows down traffic.

The invention has a particularly beneficial application to UMTS (3G) communication networks, in which each node is a radio network controller (RNC) and each base station is a Node B.

Other features and advantages of the invention will become apparent on reading the following detailed description and examining the accompanying drawings.

DETAILED DESCRIPTION OF THE PREFERRED EMBODIMENTS

The appended drawings not only provide additional information on the invention but can also contribute to the definition thereof, where necessary.

Figure 1:
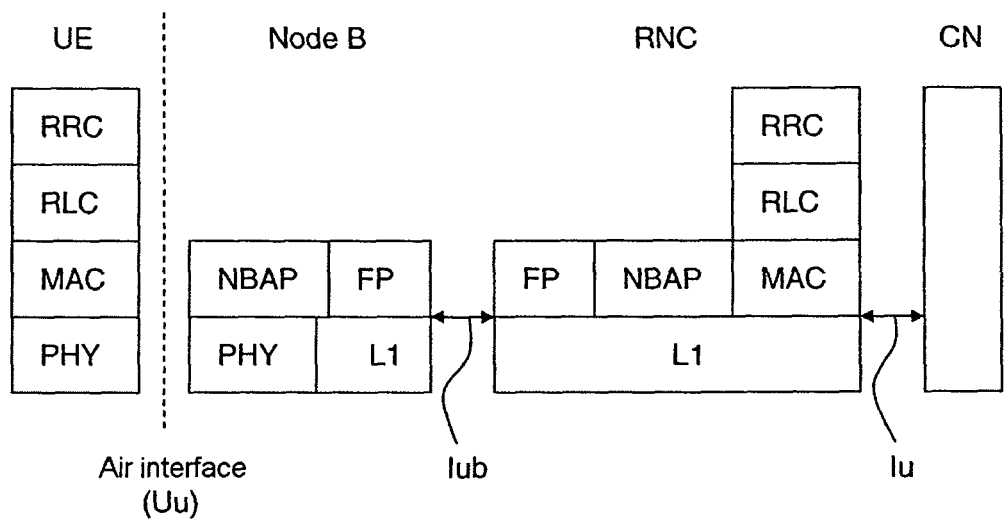
FIG. 1 is a diagram showing the main radio resource management and traffic transfer functions in a UMTS network.
Figure 2:
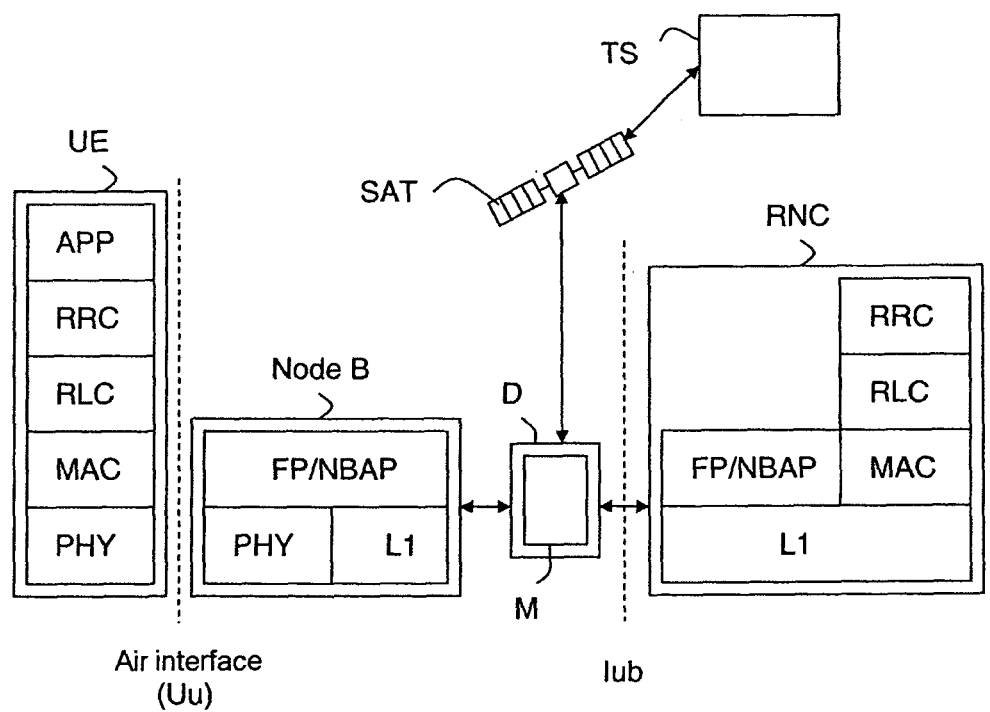
FIG. 2 is a diagram showing the main functions involved in radio resource management in a UMTS network equipped with a device according to the invention coupled to a traffic source.
Figure 3:
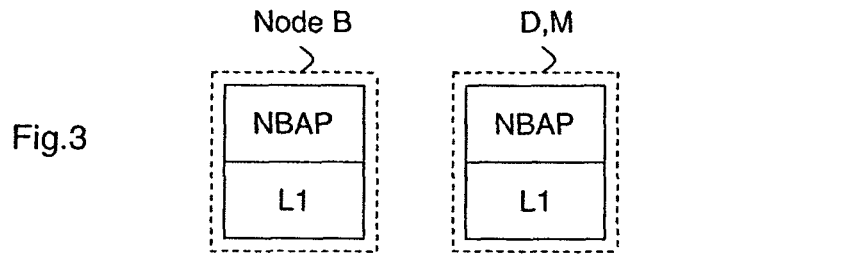
FIG. 3 is a diagram showing the portion of the protocol stack involved in the management and configuration of the Node B via the device according to the invention.

The invention is described first with reference to FIGS. 1 and 2.

The device D according to the invention is intended to be installed in a communication installation comprising at least one communication network, preferably a UMTS (3G) network.

As indicated in the introduction, and as shown in any of FIGS. 6 to 8, to be described later, a UMTS network can be described very broadly, although sufficiently precisely for the invention to be understood, as comprising a core network (CN) coupled to an access network comprising:

a plurality of nodes known as radio network controllers (RNC) coupled to the core network (CN) via an Iu interface, and a plurality of base transceiver stations, also known as Nodes B, each associated with one or more cells each covering a radio area in which one or more user equipments (UE), such as mobile telephones, may be located and coupled individually or in groups of at least two to one of the RNCs, via an Iub logical interface, which is generally a terrestrial interface. The Iub interface can comprise cable links or LDMS (fixed radio) links, for example, which have different transmission time-delays.

As shown in FIGS. 1 and 2, and as described in the introduction, the above units provide various functions that are well known to the person skilled in the art, using distributed protocol stacks. The device D according to the invention being intended to take control of at least a portion of the radio resources of at least one of the Nodes B, instead of the RNC to which that Node B is coupled via the Iub interface, there are listed hereinafter only the protocols involved in the management of the Node B radio resources:

a radio resource control (RRC) module (or layer) which manages the signaling connection used in particular when setting up and stopping communication between the user equipment UE and the Node B; for example, the RRC module inserts into the system blocks of broadcast control channel (BCCH) information relating to certain radio parameters of the cell;

a radio link control (RLC) module (or layer) which manages the transport of data between two network equipments, and in particular segments system information blocks into transport blocks;

a medium access control (MAC) module (or layer) which handles the function of multiplexing data on the various transport channels managed by the Nodes B, or in other words scheduling the various channels, including the BCCH;

a packet data convergence protocol (PDCP) module (or layer) which manages the independence of the radio protocols of the UTRAN, and in particular of the RLC and MAC layers, relative to the network data transport protocols, and handles the compression of data or data packet headers;

a broadcast/multicast control (BMC) module (or layer) which manages the broadcasting of data of all types, including multimedia data, at the radio interface;

a physical (PHY) module (or layer), also referred to as a modem, which constitutes the physical layer of the radio interface and handles coding, interleaving and modulation functions;

a frame protocol (FP) module (or layer) which manages the transport of transport blocks at the Iub interface and the transport of power control information from the RNC to the Node B, and supports transport channel synchronization and Node B synchronization mechanisms, and manages the transfer of radio interface parameters from the RNC to the Node B;

a Node B application part (NBAP) module (or layer) which manages configuration of cells controlled by the Node B, common transport channels, "resource" events enabling the Node B to inform the RNC of the status of its radio resources, and alignment of the configuration, which enables the RNC and the Node B to verify that they hold the same radio resource configuration information and to coordinate that information, where appropriate.

Figure 5:
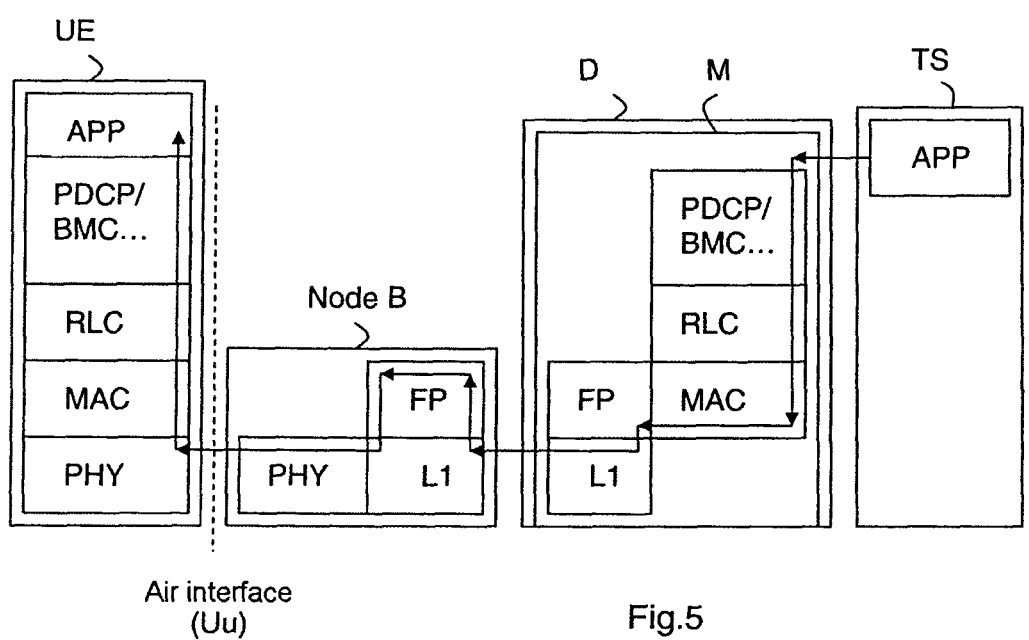
FIG. 5 is a diagram showing the portion of the protocol stack involved in the transmission of user traffic via the device according to the invention.

The PDCP/BMC, RRC, RLC and MAC layers are distributed between the user equipments UE and the RNCs (FIG. 5). The PHY layer is distributed between the user equipments UE and the Nodes B. The FP and NBAP layers are distributed between the Nodes B and the RNCs, which further include a layer L1 that links the Node B to the RNC (by means of cable or radio (LDMS) links, for example).

As shown in FIGS. 2 to 5, the device D according to the invention includes a control module M adapted, preferably momentarily and on command, to assume local control of some or all of the radio resources of one or more Nodes B, in place of the RNC to which the Nodes B are coupled. This taking of control is to allow the transmission of traffic from a traffic source, regardless of its origin. Of course, control can be taken only with the authorization of the operator of the "main" network or installation.

The control module M can take the form of electronic circuitry, software (data processing) modules, or a combination of circuitry and software.

As shown in FIG. 2, the traffic source TS can be external to the core network CN connected to the RNCs. However, as described later with reference to FIG. 6, the traffic source can be the core network CN itself. This latter situation can be particularly beneficial if it is no longer possible or no longer required to use the terrestrial links to set up the connection between the RNCs and the Nodes B.

In the FIG. 2 example, the traffic source TS is coupled to the device D via a satellite link SAT. In this example the device D includes a unit equipped with the control module M and provided with a connection interface (not shown) for coupling it to a Node B and to the Iub interface between the Node B and the corresponding RNC. The device B is therefore inserted between the Node B and the Iub interface, in a manner that is transparent not only to the Node B and the RNC but also to the protocols operative at the Iub interface.

In this plug and play embodiment of the device D, it is necessary to provide a device D for each Node B whose local radio resources can be taken control of momentarily and on command. Of course, other embodiments of the device D can be envisaged, as explained later with reference to FIGS. 6 to 8.

To be able to take control of the local radio resources of the Node B to which it is coupled, the device D (to be more precise its control module M) includes a plurality of dedicated modules, described later, and the portion of the stack of protocols (or layers) standardized by the 3GPP (in the case of a UMTS network) installed in the RNC and dedicated to said control. Thus it includes, firstly, the portion of the NBAP layer dedicated to management and configuration of the Node B (see FIG. 3), secondly, the portion of the FP, RRC, RLC and MAC layers dedicated to the transfer of signaling, and, thirdly, the portion of the PDCP/BMC, RLC, MAC and FP layers dedicated to the transfer of traffic between the traffic source TS and a user equipment UE.

A first dedicated module is adapted to filter, firstly, the traffic coming from the traffic source TS and, secondly, the terrestrial traffic coming from the RNC. Thanks to the filter module, the device D can detect that the traffic source TS requires to transmit traffic via the Node B to which it is coupled and can then act accordingly by starting a resource reservation request procedure.

A second dedicated module is adapted to generate messages telling the RNC that the resources of the Node B to which it is coupled via the Iub interface have been blocked.

A third dedicated module is adapted to adapt the synchronization of the various traffic streams arising at the device D and addressed to the Node B to which it is coupled. This compensates the divergence between the transmission time-delays of traffic from the traffic source and from the RNC.

Figure 4:
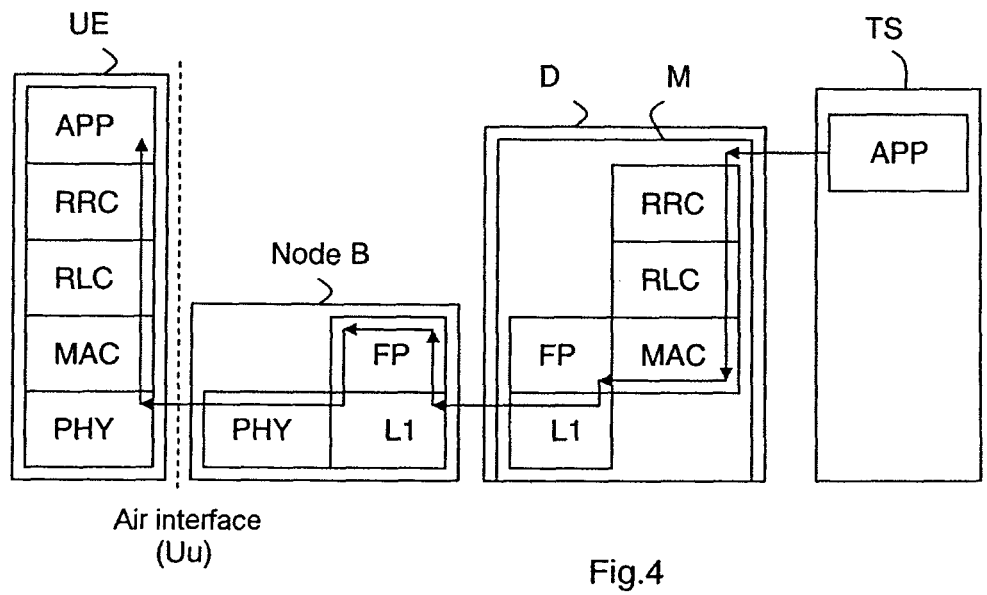
FIG. 4 is a diagram showing the portion of the protocol stack involved in the transfer of signals between the traffic source and the user equipment via the device according to the invention.

The arrows in FIGS. 4 and 5 show the physical path of data through the layers involved in the operations previously cited, from the traffic source TS to the user equipment UE, via the device D and the Node B. Moreover, in FIGS. 4 and 5, the layers APP are the application layers installed in the traffic source TS and in a user equipment UE.

Equipped with the dedicated modules and the portions previously cited of the protocol stacks, the device D can therefore be substituted for the RNC, to enable transmission of traffic (or transfer of data) between the traffic source TS to which it is coupled and the Node B to which it is coupled.

Data can be transferred from a traffic source TS to a Node B in the following manner, for example.

In a first step, the traffic source TS transmits to the device D, for example via the satellite link SAT, a request to transfer traffic addressed to one or more user equipments UE situated in one of the cells controlled by the Node B to which it is coupled. On receipt of this request, the control module M of the device D sends the Node B a request to reserve some or all of its local radio resources.

In a second step, the Node B assesses the availability of its radio resources and then sends the control module M a response message specifying which resources it can make available to the traffic source TS. If this suits the control module M, it sends the Node B a message telling it that the proposed resources must be blocked (for the transmission of the traffic) and sends the RNC concerned, via the Iub interface, a message telling it which resources are blocked.

In a third step, the control module M can tell the traffic source TS that it can transfer its traffic to the Node B. This solution is preferable, but in some types of satellite network there is no provision for return of information to the satellite, the traffic from the satellite being sent directly to the device D without waiting for authorization by the device. Once the transmission of data (or traffic) has finished, the control module M sends a message to the Node B to tell it that it can liberate the radio resources that have just been used and a message to the RNC, via the Iub interface, to tell it that the resources have been unblocked and that it can again control all of the radio resources of the Node B.

Three embodiments of an installation according to the invention are described in more detail next with reference to FIGS. 6 to 8.

Figure 6:
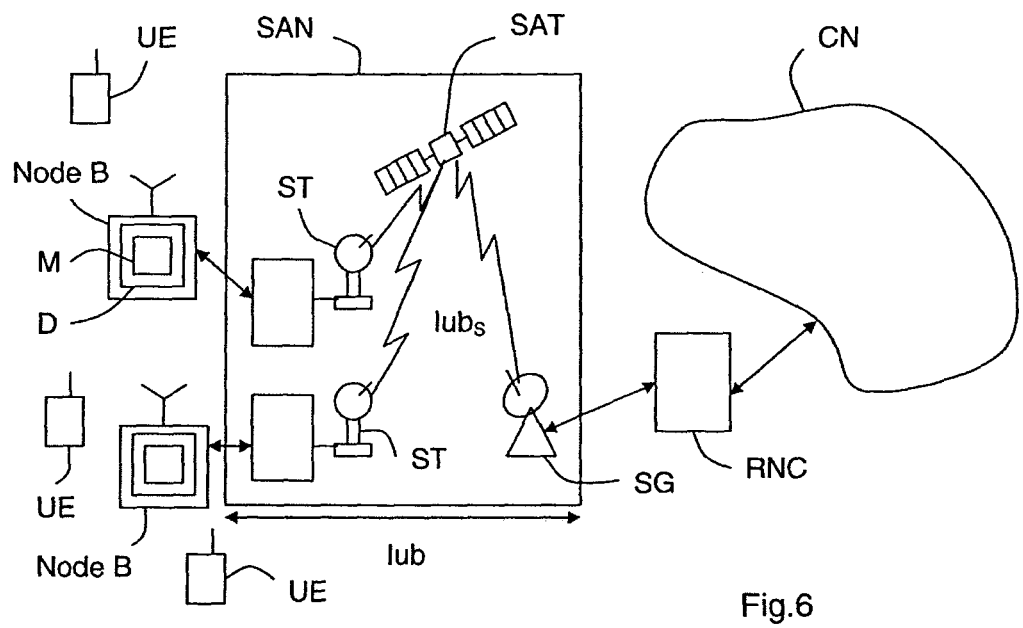
FIG. 6 is a diagram showing a portion of a first communication installation according to the invention.

The embodiment shown in FIG. 6 is more particularly dedicated to what the person skilled in the art refers to as backhauling via satellite. It is a question of transferring via a satellite link all of the traffic that usually circulates on a terrestrial link between user equipments UE and the core network CN via a Node B and an RNC. Thus in this example the core network CN constitutes the traffic source TS.

This example uses a satellite access network SAN including a satellite gateway SG connected to the RNC for access to the core network CN, one or more transmit/receive satellite terminals ST, each of which is preferably connected to a Node B, and at least one satellite SAT adapted to exchange data by radio, at a frequency $f_{FSS}$, with the satellite gateway SG and the satellite terminals ST. The satellite link constitutes a satellite interface $Iub_S$. Furthermore, the RNC provides both the service and the control functions. It is then referred to as a "controlling and serving RNC".

In the example shown, each Node B is equipped with a device D according to the invention which filters all the data coming from the satellite terminal ST. In a first variant, shown in FIG. 2, the device could be of the plug and play type, and in this case it would be located between the Node B and the corresponding satellite terminal ST. In a second variant, the device D could be installed in the satellite terminal ST so as to be able to filter the data from the satellite link before it reaches the Node B.

To meet the severe real time constraints of the UMTS radio interface, the control module M of the device D is adapted to take account of the time-delay introduced by the satellite link relative to the terrestrial link usually employed in the UMTS network. The services offered by the network are usually provided via the terrestrial link (which has a short transmission time-delay), and consequently, if the characteristics of the link are changed, the equipments must be reconfigured so that the services are maintained without degrading quality.

Figure 7:
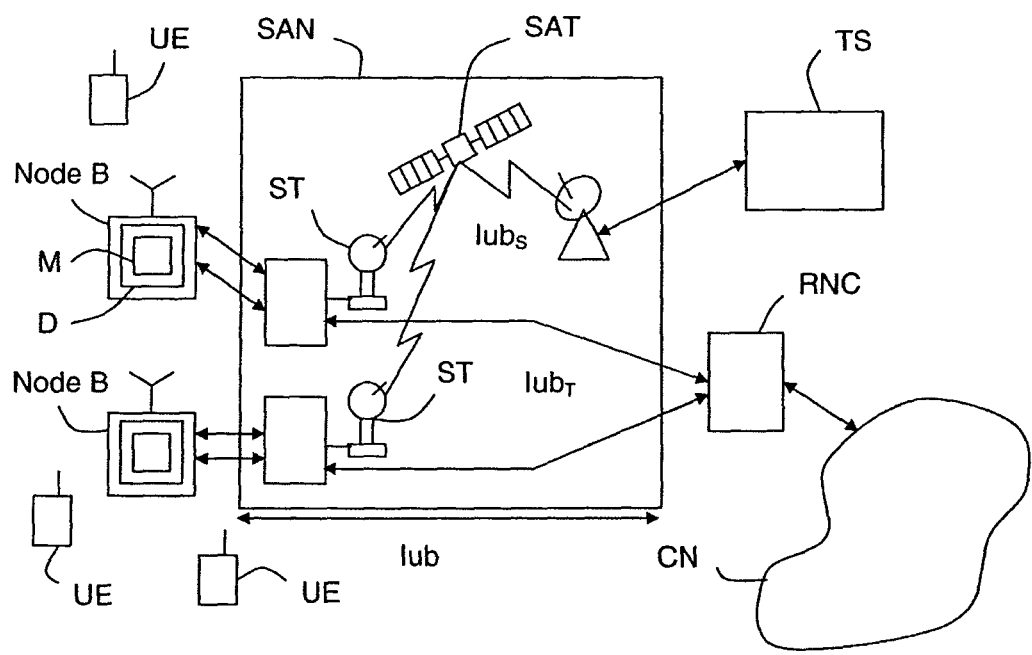
FIG. 7 is a diagram showing a portion of a second communication installation according to the invention.

The embodiment shown in FIG. 7 is more particularly dedicated to the insertion of "external" traffic. It is a question of exploiting the infrastructure offered by the UMTS network to transfer, for example via a satellite link, traffic emanating from a traffic source TS external to the core network CN, instead of or in addition to the "internal" traffic usually emanating from the core network CN.

This embodiment also uses a satellite access network SAN including a satellite gateway SG connected to the traffic source TS, one or more transmit/receive satellite terminals ST, each of which is preferably connected to a Node B, and at least one satellite SAT adapted to exchange data by radio at a frequency $f_{FSS}$ with the satellite gateway SG and the satellite terminals ST. The satellite link constitutes a satellite interface $Iub_S$. Moreover, each satellite terminal ST is also connected to the RNC coupled to the core network CN via a terrestrial interface $Iub_T$, by virtue of the fact that it is connected to ("plugged into") the Node B. The connection between the satellite terminal ST and the Node B is preferably duplicated to separate external traffic coming from the traffic source TS from internal traffic coming from the core network CN.

In the example shown, each Node B is equipped with a device D according to the invention which filters all "external" data coming from the satellite terminal ST and "internal" data coming from the RNC. In a first variant, shown in FIG. 2, the device could be of the plug and play type, in which case it would be located between the Node B and the corresponding satellite terminal ST. In a second variant, the device D could be installed in the satellite terminal ST so as to be able to filter data from the satellite interface $Iub_S$ and the terrestrial interface $Iub_T$ before it reaches the Node B.

In this example, the internal and external traffic must both share the local radio resources offered by the Node B or be provided with their own, separate resources. Now, because of synchronization differences between the transport channels used for the internal and external traffic, the device D is adapted to configure the network equipments as a function of the origin of the traffic, and in particular to synchronize the transport channels.

Figure 8:
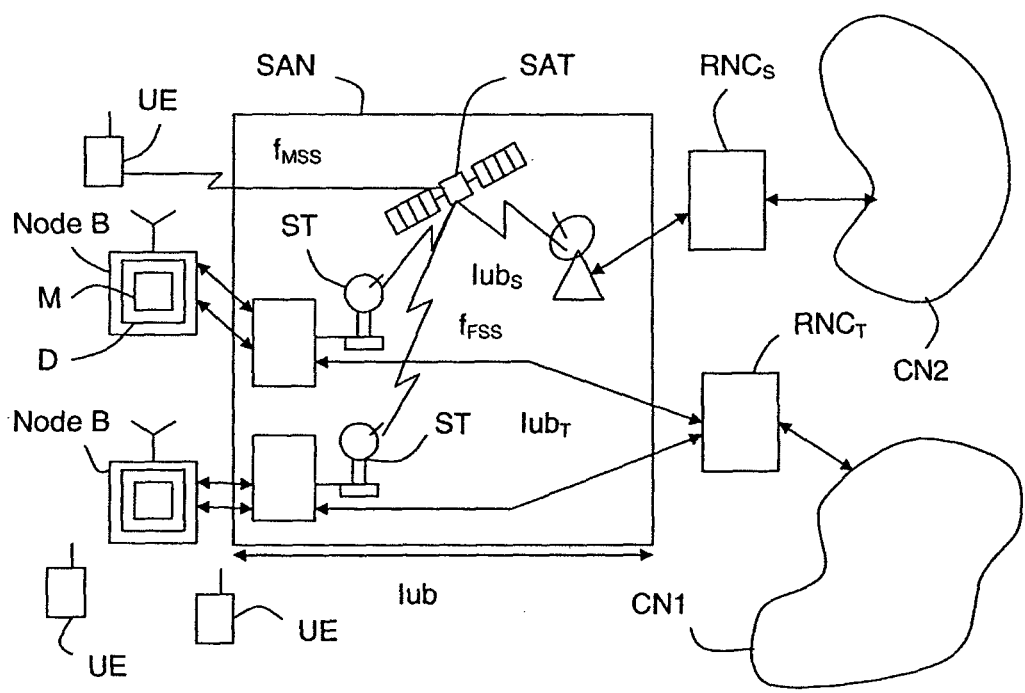
FIG. 8 is a diagram showing a portion of a third communication installation according to the invention.

The embodiment shown in FIG. 8 is a variant of the FIG. 7 installation. It is more particularly dedicated to the use of Nodes B as terrestrial repeaters in a satellite multimedia digital broadcasting installation. Here it is a question of using the resources offered by the Nodes B of a terrestrial UMTS network, including a first core network CN1, for terrestrial relaying of traffic from a satellite network, including a second core network CN2, transmitted directly by radio via a satellite SAT to the user equipments UE.

This embodiment uses a satellite access network SAN including a satellite gateway SG connected to a second core network CN2 (which constitutes a second traffic source) via an $RNC_S$, one or more transmit/receive satellite terminals TS, each of which is preferably connected to a Node B, and at least one satellite SAT adapted to exchange data by radio on first and second frequencies $f_{FSS}$ and $f_{MSS}$, respectively, with the satellite terminals ST and the user equipments UE. The satellite link between the satellite SAT, the satellite terminals ST and the satellite gateway SG constitutes a satellite interface $Iub_S$. Moreover, each satellite terminal ST is also connected to the $RNC_T$ coupled to the core network CN via a terrestrial interface $Iub_T$. The connection between the satellite terminal ST and the Node B is preferably duplicated, to separate traffic from the first core network CN1 from traffic from the second core network CN2.

Traffic from the satellite terminal ST and traffic from the satellite SAT are transmitted on the UMTS radio channel at respective different carrier frequencies. In particular, the repeater Node B receives from the satellite SAT on the frequency $f_{FSS}$ the traffic to be relayed to the user equipments UE concerned on the frequency $f_{MSS}$. The traffic from the RNC is transmitted by the Node B on a frequency different from the frequency $f_{MSS}$.

In the example shown, each Node B is equipped with a device D according to the invention which filters all "external" data from the satellite terminal ST on the frequency $f_{FSS}$ and "internal" data from the $RNC_T$. In a first variant as shown in FIG. 2 the device could be of the plug and play type, in which case it could be located between the Node B and the corresponding satellite terminal ST. In a second variant, the device D could be installed in the terminal satellite ST so as to be able to filter the data from the satellite interface $Iub_S$ and from the terrestrial interface $Iub_T$ before it reaches the Node B.

In this example, internal and external traffic must share the local radio resources offered by the Node B, or be provided with them completely but separately. Now, because of the use of two different RNCs ($RNC_S$ and $RNC_T$), there are synchronization differences between the transport channels used for internal and external traffic. The device D is therefore adapted to configure the network equipments as a function of the origin of the traffic, and in particular to synchronize the transport channels.

Moreover, because of the different processing applied to, and the different paths taken by, external data from the satellite SAT on the frequencies $f_{FSS}$ and $f_{MSS}$, the same data can reach the user equipments UE with a time difference, which could interfere with services. To take account of this time difference, the satellite SAT usually transmits its traffic to the device D on the frequency $f_{FSS}$ with a maximum timing advance relative to that which it transmits to the mobile equipments on the frequency $f_{MSS}$ of approximately 6.5 milliseconds (ms), if it is of the geosynchronous type and provides European coverage, or approximately 2.5 ms, if it is of the geosynchronous type and provides national coverage. Thanks to this timing advance, it is possible to provide broad compensation of data processing times at the level of the Node B.

However, the timing advance will be the same for all the Nodes B, and because the latter do not always have the same characteristics and/or the same coverage areas, they cannot enable the data to reach the user equipments via the two channels substantially simultaneously (or within a time window predefined by the 3GPP, for example) in all circumstances.

The synchronization module described above is intended to cure this drawback. It is therefore adapted to calculate the transmission difference that will enable the data traveling on the two channels to arrive at the same location in the same time window. The difference is calculated as a function in particular of the size of the coverage are of the repeater Node B, and possibly the size of the area covered by the satellite. When the difference has been calculated, the device D uses its synchronization module to delay transmission of received data to the Node B by an amount substantially equal to the calculated difference.

Thanks to the invention, it is possible to decentralize some cell and traffic management functions and consequently to prevent any additional time-delay being introduced by the insertion into the network of a traffic source, where applicable via the satellite link.

Moreover, the invention can insert traffic directly at the level of a base station, such as a Node B, which can be very useful for handling broadcast traffic emanating from a satellite, for example.

Furthermore, the invention can be used for the exchange of data between user equipments situated in cells managed by the same base station.

Finally, the invention enables a base station to continue to be used when its (terrestrial) link to an RNC node is cut, either for technical reasons, for example for maintenance or repair, or because the access network operator wishes to make the network inaccessible.

The invention is not limited to the embodiments of installations and devices described above by way of example only, but encompasses all variants that the person skilled in the art might envisage within the scope of the following claims.

Thus the invention has been described in an application to third generation (3G) networks such as UMTS networks, but subject to the necessary modifications it applies to other types of network, for example CDMA 2000 networks and 2G and 2.5G networks such as GSM and GPRS networks, in particular if the operator wishes to isolate a portion of his network.

Moreover, the invention is not limited to radio resources. It applies to other types of resources, for example optical, mechanical (in particular acoustic), and electrical (analog) resources.

Furthermore, the invention is not limited to the use of stacks of protocols dedicated to the management of base station resources. It applies generally to any means of implementing functions similar to or equivalent to those offered by said protocol stacks.

There is claimed:

1. A data management device for a communication installation including at least one base station having resources and at least one terrestrial node connected to a core network and to said base station to control its resources via an interface, the device comprising a control device configured to be coupled to a traffic source and to said interface and configured to take local control, on command, of at least a portion of said resources of said base station, instead of said terrestrial node, to enable transfer of data between said traffic source and said base station, wherein the control device is further configured to:

send said base station a resource reservation request on receipt of a request to transmit traffic to at least one user equipment situated in a cell managed by said base station and coming from said traffic source, send said node, by a message generator module of said control device, a message indicating that said resources are blocked on receipt of a response message generated by said base station indicating availability of resources, and send a message to said base station to release said resources that have been used and a message to said node to tell it that said resources have been unblocked when said traffic from said traffic source is finished.

2. The device claimed in claim 1 wherein said control device includes at least a portion of a stack of protocols dedicated to managing synchronization of channels under the control of said base station.

3. The device claimed in claim 2 wherein, in an installation which transmits data from said traffic source by radio, at first and second frequencies, respectively to user equipments situated in a cell managed by said base station and to said base station, said control device is further configured to calculate a transmission difference representative of the difference between the transmission times of said data at said first and second frequencies and to delay data received and to be transmitted to said base station by an amount equal to the calculated difference.

4. The device claimed in claim 3 wherein said difference is a function of dimensions of a coverage area of satellite data transmission and/or a coverage area of said base station.

5. The device claimed in claim 3 wherein said control device includes a synchronization adaptor module configured to calculate said transmission time differences between traffic from said traffic source and from said node.

6. The device claimed in claim 1 further comprising a module provided with a connection interface.

7. The device claimed in claim 6 wherein said module is configured to be connected to said base station via said connection interface.

8. The device claimed in claim 6 wherein said module is configured to be connected via said connection interface to a satellite terminal coupled to said base station and to a satellite supplied by said traffic source.

9. The device claimed in claim 1 wherein said control device includes at least a portion of a stack of protocols dedicated to management of said resources to:

manage the configuration of at least one portion of at least one cell managed by said base station and the associated resources, control at least one portion of the configuration of data transport channels managed by said base station, manage "resource" events generated by said base station and representative of the status of its resources, and check that identical configuration information is held by said base station and said node.

10. The device claimed in claim 9 wherein said portions of said stack of protocols dedicated to resource management and synchronization are chosen from a group comprising at least a portion of the Node B Application Part protocol, at least a portion of the Radio Resource Control protocol, at least a portion of the Frame Protocol, at least a portion of the Radio Link Control protocol, at least a portion of the Medium Access Control protocol, at least a portion of the Packet Data Convergence protocol, and at least a portion of the Broadcast/Multicast Control protocol.

11. The device claimed in claim 1 wherein said control device includes a filter module configured to filter said traffic from said traffic source and said traffic from said node.

12. The device claimed in claim 1, wherein the device is installed in said base station.

13. The device claimed in claim 1, wherein the device is installed in a satellite terminal coupled to said base station and to a satellite supplied by said traffic source.

14. The device claimed in claim 1 wherein the device is used in a UMTS communication network, each terrestrial node being a radio network controller and each base station being a Node B.

15. A communication installation comprising at least one base station having resources and at least one terrestrial node connected to a first core network and to said base station to control its resources via an interface, the installation comprising a device including a control device configured to be coupled to a traffic source and to said interface and configured to take local control, on command, of at least a portion of said resources of said base station, instead of said terrestrial node, to enable transfer of data between said traffic source and said base station, wherein the control device is further configured to:

send said base station a resource reservation request on receipt of a request to transmit traffic to at least one user equipment situated in a cell managed by said base station and coming from said traffic source, send said node, by a message generator module of said control device, a message indicating that said resources are blocked on receipt of a response message generated by said base station indicating availability of resources, and send a message to said base station to release said resources that have been used and a message to said node to tell it that said resources have been unblocked when said traffic from said traffic source is finished.

16. The installation claimed in claim 15, further comprising a satellite access network.

17. The installation claimed in claim 16 wherein said satellite access network includes at least one satellite gateway connected to said node, at least one satellite terminal connected to one of said base stations, and at least one communication satellite configured to exchange data by radio with said satellite gateway and with said satellite terminal, said node and said core network together constituting said traffic source.

18. The installation claimed in claim 16 wherein said satellite access network includes at least one satellite gateway connected to a traffic source, at least one satellite terminal connected to one of said base stations and to said node, and at least one communication satellite configured to exchange data by radio with said satellite gateway and with said satellite terminal.

19. The installation claimed in claim 16 wherein said satellite access network includes at least one satellite gateway connected to a satellite node connected to a second core network and together therewith constituting said traffic source, at least one satellite terminal connected to one of said base stations and to said node, and at least one communication satellite configured to exchange data by radio with said satellite gateway, with said satellite terminal, and with user equipments configured to exchange data with said base station via said resources.

* * * * *